(12) United States Patent
Minoura et al.

(10) Patent No.: US 10,472,175 B2
(45) Date of Patent: Nov. 12, 2019

(54) CARRIAGE-UTILIZING CONVEYING EQUIPMENT

(71) Applicants: Honda Motor Co., Ltd., Tokyo (JP); Daifuku Co., Ltd., Osaka (JP)

(72) Inventors: Takafumi Minoura, Tokyo (JP); Yoshifumi Yasuda, Shiga (JP)

(73) Assignees: Honda Motor Co., Ltd. (JP); Daifuku Co., Ltd. (JP)

( * ) Notice: Subject to any disclaimer, the term of this patent is extended or adjusted under 35 U.S.C. 154(b) by 0 days.

(21) Appl. No.: 16/269,150

(22) Filed: Feb. 6, 2019

(65) Prior Publication Data

US 2019/0248586 A1 Aug. 15, 2019

(30) Foreign Application Priority Data

Feb. 9, 2018 (JP) ................................. 2018-022131

(51) Int. Cl.
*B65G 19/02* (2006.01)
*B65G 35/06* (2006.01)
*B65G 17/06* (2006.01)
*B65G 17/00* (2006.01)

(52) U.S. Cl.
CPC ......... *B65G 17/066* (2013.01); *B65G 17/002* (2013.01); *B65G 19/02* (2013.01); *B65G 35/06* (2013.01); *B65G 2201/02* (2013.01)

(58) Field of Classification Search
CPC ...... B65G 19/02; B65G 35/06; B65G 17/002; B65G 17/066
USPC .................................. 198/822, 832, 850–853
See application file for complete search history.

(56) References Cited

U.S. PATENT DOCUMENTS

| | | | | |
|---|---|---|---|---|
| 1,757,652 A | * | 5/1930 | Bethke | B65G 17/066 198/853 |
| 1,800,663 A | * | 4/1931 | Schade | B65G 17/066 198/853 |
| 3,554,360 A | * | 1/1971 | Bildsoe | B65G 17/066 198/793 |
| 5,042,648 A | * | 8/1991 | Garvey | B65G 17/066 198/321 |
| 5,201,407 A | * | 4/1993 | Proske | B65G 23/14 198/833 |

(Continued)

FOREIGN PATENT DOCUMENTS

JP 2016078984 A 5/2016

*Primary Examiner* — Douglas A Hess
(74) *Attorney, Agent, or Firm* — St. Onge Steward Johnston & Reens LLC (57) ABSTRACT

Conveying equipment includes carriages having a frame with front and rear ends coupled to adjacent carriages by vertical support shafts and having a floor board which is supported by the frame. A floor board main portion has a protruding arc-shaped end edge concentric with one of the vertical support shafts and a floor board sub-portion which has a recessed arc-shaped end edge concentric with the other vertical support shaft. The protruding arc-shaped end edge in one carriage and the recessed arc-shaped end edge in an adjacent carriage are relatively rotatable around the common vertical support shaft located at the arc centers of each of the edges. The floor board main portion overhangs from one end of the frame in each of the carriages and is supported on an overhanging portion which overhangs from the floor board sub-portion in the adjacent carriage so as to be freely relatively rotated.

2 Claims, 5 Drawing Sheets

(56) References Cited

U.S. PATENT DOCUMENTS

| | | | | |
|---|---|---|---|---|
| 5,394,978 | A * | 3/1995 | Majewski, Sr. | B65G 23/16 198/831 |
| 5,404,997 | A * | 4/1995 | Schreier | B65G 17/086 198/779 |
| 6,196,380 | B1 * | 3/2001 | Teuber | B65G 17/40 198/851 |
| 6,527,106 | B2 * | 3/2003 | Tanabe | B65G 17/086 198/845 |
| 6,981,584 | B2 * | 1/2006 | Grabmann | B65G 17/065 198/850 |
| 7,588,140 | B2 * | 9/2009 | van den Goor | B65G 17/066 198/831 |
| 9,174,803 | B2 * | 11/2015 | Cleaves | B65G 17/22 |
| 9,663,301 | B2 * | 5/2017 | Shiki | B61B 13/127 |
| 9,938,732 | B1 * | 4/2018 | Hay, Jr. | E04G 1/24 |

* cited by examiner

CARRIAGE-UTILIZING CONVEYING EQUIPMENT

FIELD OF THE INVENTION

The present invention relates to conveying equipment which includes workpiece-conveying carriages that travel on a traveling path including a horizontal curved path section in a state where they are coupled to each other.

BACKGROUND OF THE INVENTION

In this type of conveying equipment, the following configuration has been known as a configuration in which a work floor surface which is substantially continuous in the shape of a band without any gaps is formed by a carriage line while making it possible for respective carriages to travel so as to be rotated in a horizontal curved path section, for example, as described in Japanese Published Unexamined Patent Application No. 2016-78984 [Patent Literature 1], instead of directly coupling workpiece convening carriages to each other so as to freely swing relatively horizontally around a vertical support shaft, a relay carriage is interposed between two workpiece convening carriages which are adjacent to each other in a forward/backward direction, two portions of the front and the rear of the relay carriage are coupled to the front and rear workpiece convening carriages so as to freely swing relatively horizontally around the vertical support shaft, both front and rear end edges of the workpiece convening carriage are formed as protruding arc-shaped end edges which are concentric with the vertical support shaft and both the front and rear end edges of the relay carriage are formed as recessed arc-shaped end edges which are adjacent to the protruding arc-shaped end edges of the front and rear workpiece convening carriages, which can be relatively rotated around the vertical support shaft and which are concentric with the vertical support shaft.

SUMMARY OF THE INVENTION

In the above-described conventional conveying equipment such as the configuration described in Patent Literature 1, the number of parts in the entire equipment is increased due to the presence of the relay carriage, such as an increase in the number of joint portions formed by a carriage structure and the vertical support shaft, and moreover, between two front and rear workpiece convening carriages, two adjacent portions of the arc-shaped end edges are present which are adjacent to each other so as to be relatively rotated. That is, since there are as many as two adjacent portions of the arc-shaped end edges present between the two front and rear workpiece convening carriages, in the entire equipment, an extremely large number of adjacent portions of the arc-shaped end edges are present. Therefore, from the viewpoint of the conventional configuration described above, it is expected that various problems occur due to wear produced by sliding contact between the adjacent portions of the arc-shaped end edges or the entanglement of small foreign matter into the sliding portion, such as inhibition of smooth traveling, generation of abnormal noise and time-consuming and costly maintenance and inspection, etc.

The present invention proposes carriage-utilizing conveying equipment which can solve the conventional problems described above, and for ease of understanding of a relationship with an embodiment which will be described later, the carriage-utilizing conveying equipment according to the present invention will be shown below with reference symbols which are used in the description of the embodiment and which are placed in parentheses. In conveying equipment which includes workpiece-conveying carriages (3) that travel on a traveling path including a horizontal curved path section (2) in a state where the carriages are coupled to each other so as to freely swing relatively horizontally around a vertical support shaft (11), each of the carriages (3) is formed with a frame portion (4) whose front and rear ends are both coupled to other adjacent carriages (3) with the vertical support shafts (11) and a floor board portion (5) which is supported by the frame portion (4), the floor board portion (5) is formed with a floor board main portion (14) which includes a protruding arc-shaped end edge (14a) concentric with either one of the front and rear vertical support shafts (11) and a floor board sub-portion (15) which includes a recessed arc-shaped end edge (15a) concentric with the other vertical support shaft (11), the protruding arc-shaped end edge (14a) of the floor board main portion (14) in one of the carriages (3) adjacent in a forward/backward direction and the recessed arc-shaped end edge (15a) of the floor board sub-portion (15) in the other carriage (3) are adjacent such that the protruding arc-shaped end edge (14a) and the recessed arc-shaped end edge (15a) are relatively rotatable at the same height around the common vertical support shaft (11) located at arc centers of each of the edges, and the floor board main portion (14) which juts out, in one direction, from one end portion of the frame portion (4) in each of the carriages (3) is supported on an overhanging portion (27) which overhangs from the floor board sub-portion (15) of the frame portion (4) in the adjacent carriage (3) so as to be freely relatively rotated.

According to the above-described configuration of the present invention, while a carriage floor surface which is continuous in the shape of a band can be formed on a line of carriages which travel along a traveling path including a horizontal curved path section, a simple configuration is provided in which an extremely small number of parts are used and in which specifically, a relay carriage adopted in the conventional configuration is not present and only one joint portion produced by a vertical support shaft is present for one carriage, with the result that the present invention can be implemented extremely inexpensively. Moreover, the number of relative rotating portions of arc-shaped end edges present between the respective carriages is halved as compared with the conventional configuration, and thus the degree of occurrence of problems caused by the presence of the relative rotating portions of the arc-shaped end edges can be halved. As a matter of course, a floor board main portion which includes a protruding arc-shaped end edge that overhangs from the frame portion of each carriage is also supported on the overhanging portion of the frame portion of the adjacent carriage, it is therefore possible to effectively utilize the entire floor board portions of the respective carriages for supporting workpieces or as a work floor surface.

In a case where the above-described present invention is implemented, basically, it is also possible to configure such that both a rightward-curved horizontal curved path section and a leftward-curved horizontal curved path section are adapted to a layout present in the traveling path, however, it is possible to configure such that, in a case where a layout is used in which only either one of the rightward-curved horizontal curved path section and the leftward-curved horizontal curved path section is present in the traveling path, the left/right lateral width of the floor board sub-portion (15) is narrower than the maximum left/right lateral width of the floor board main portion (15) such that, when the carriages (3) are in a linear path section (1A, 1B) of the traveling path, the outer sides of the respective carriages (3) on a side opposite to the side of a carriage turning direction are linearly connected in parallel to the linear path section (1A, 1B) such that in the inner sides of the respective carriages (3) on the side of the carriage turning direction, the end portions of the protruding arc-shaped end edges (14a) of the floor board main portions (14) are protruded laterally from linear sides at regular intervals. According to this configuration, while the linear sides of the respective carriages parallel to each other, that is, the left/right lateral width of the floor board sub-portion in the floor board portion is ensured to the maximum necessary, the rotating angle with respect to a certain turning direction of each carriage in the horizontal curved path section can be sufficiently increased, with the result that it is possible to reduce the radius of curvature of the horizontal curved path section. Also, a friction driving plate-shaped member (9a) can be arranged along the outer sides of the respective carriages (3) on one side which are linearly continuous, it is therefore possible to easily realize a configuration in which the respective carriages are propelled by a friction drive device in which the respective carriages are additionally provided in the linear path section, that is, a friction drive device (31) including a friction drive wheel (31a) pressed against the side surface of the friction driving plate-shaped member (9a).

It is noted that, in a case where the configuration described in the above paragraph is adopted, the frame portion (4) of the carriage (3) includes an outer frame portion (7) which overhangs to the side opposite to the side of the carriage turning direction with respect to a center line connecting the vertical support shafts (11) at both the front and rear ends and an inner frame portion (8) which overhangs to the side of the carriage turning direction with respect to the center line, the outer frame portion (7) is rectangular so as to have a substantially same length as the center line and forms an overhanging main portion (28) which overhangs from the recessed arc-shaped end edge (15a) of the floor board sub-portion (15) to the vicinity of the arc center thereof so as to support an outer half of the floor board main portion (14) of the adjacent carriage (3), the inner frame portion (8) is shorter than the outer frame portion (7), and forms an overhanging sub-portion (29) which is protruded from the recessed arc-shaped end edge (15a) of the floor board sub-portion (15) so as to support the vicinity of the protruding arc-shaped end edge (14a) of the floor board main portion (14) of the adjacent carriage (3), and the overhanging main portion (28) and the overhanging sub-portion (29) can form the overhanging portion (27) which supports the floor board main portion (14) of the adjacent carriage (3). According to this configuration, the overhanging portion of the frame portion of each carriage is made sufficiently large, it is therefore possible to stably support the floor board main portion of the adjacent carriage, and a sufficiently long space is ensured between the inner frame portion whose length is short and the inner frame portion whose length is short in the frame portion of the adjacent carriage, it is therefore possible to increase the flexion angle to the side of the turning direction of both the front and rear carriages when turning the horizontal curved path section, with the result that it is possible to further reduce the radius of curvature of the horizontal curved path section.

In an end portion of the frame portion of the carriage on the side of the floor board main portion, the vertical support shaft is arranged. In an end portion of the frame portion (4) on the side of the floor board main portion (14), an upper bearing (12) to which the vertical support shaft (11) is attached so as to be freely inserted/removed in an up/down direction is provided, in an end portion of the frame portion (4) on the side of the floor board sub-portion (15), a lower bearing (13) which is overlaid on the lower side of the upper bearing (12) and through which the vertical support shaft (11) protruded from the upper bearing (12) is inserted so as to be freely relatively rotated is provided, and in the floor board portion (5), an opening portion (23) through which the vertical support shaft (11) is attached/detached with respect to the upper bearing (12) and a cover floor board (24) which blocks the opening portion (23) and which is freely attached/detached are provided. According to this configuration, when the carriages adjacent in the forward/backward direction are coupled with the vertical support shafts, both the carriages are moved so as to approach each other on the traveling path, on the lower side of the upper bearing of the carriage on one side, the lower bearing of the carriage on the other side is overlaid, thereafter, the vertical support shaft is inserted through the opening portion of the floor board portion of the carriage on one side from above into both the upper and lower bearings, the vertical support shaft is fixed to the upper bearing and thereafter the opening portion can be blocked by the cover floor board. In other words, an operation of coupling the front and rear carriages with the vertical support shafts can be simply and easily performed without an operation of raising the carriages, and moreover, the entire surface of the floor board portion can be effectively utilized as a flat floor surface.

It is noted that, in order to make the respective carriages travel along the traveling path, a carriage guiding groove-shaped guide rail (25) is laid along the traveling path, and a roller (26) which is loosely fitted into the guide rail (25) and which is self-rotatable around a vertical axis is pivotally supported to the side of the carriage (3), however, by pivotally supporting the roller (26) to the lower end of the vertical support shaft (11) and setting the diameter thereof equal to or less than the diameter of the vertical support shaft (11), the adjacent carriages can be coupled to each other by the procedure described above with the vertical support shafts in a state where the roller is attached to the lower end, and simultaneously, the roller can be loosely fitted into the carriage guiding groove-shaped guide rail, with the result that, as compared with a case where the roller loosely fitted into the carriage guiding groove-shaped guide rail needs to be attached to the lower end of the vertical support shaft on the lower side of the carriage after the operation of coupling the carriages, an assembly operation can be performed extremely simply, easily and efficiently.

BRIEF DESCRIPTION OF THE DRAWINGS

5B is a vertically cross-sectional side view in a state where the coupling portion is disassembled.

DETAILED DESCRIPTION OF THE INVENTION

Figure 1:
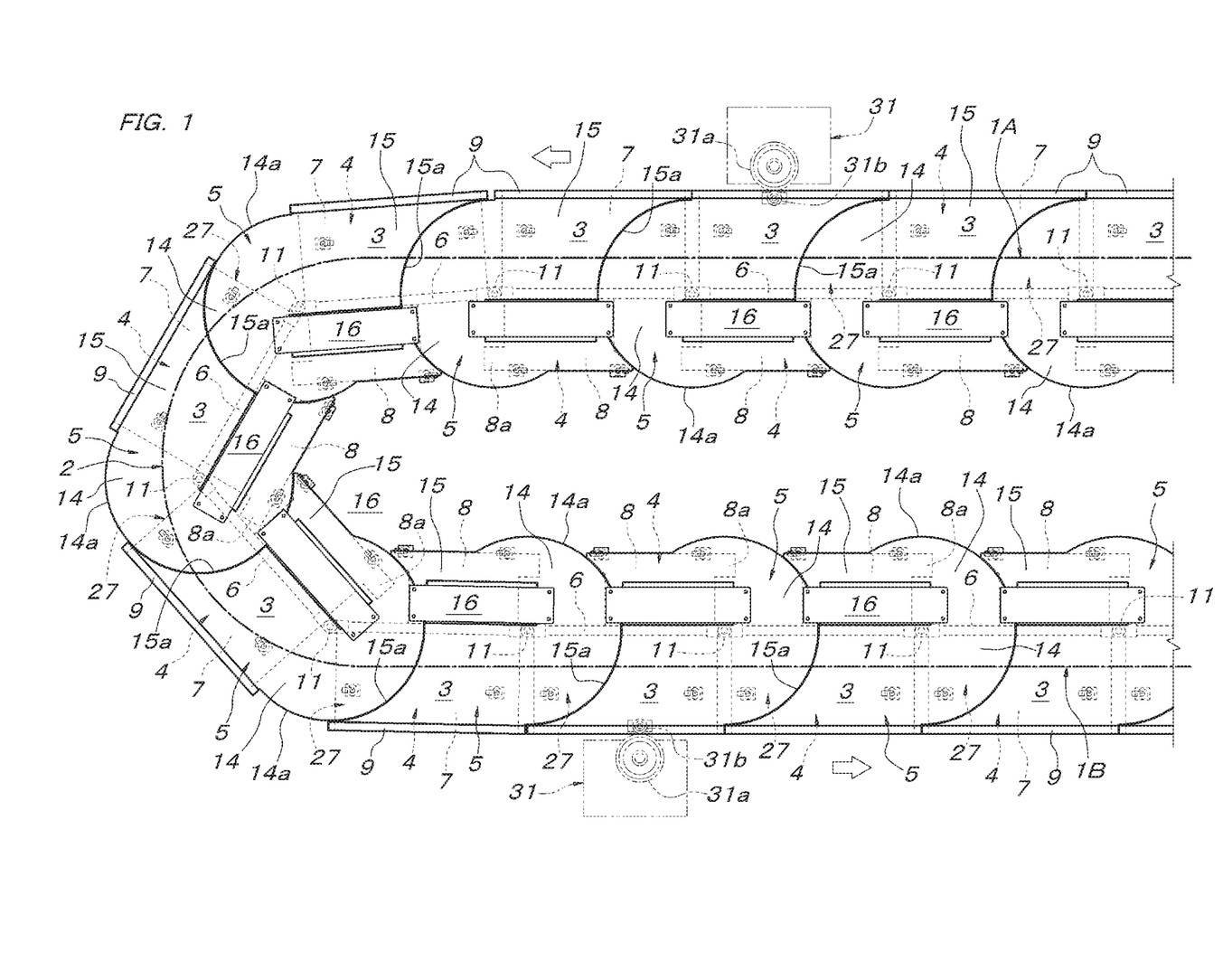
FIG. 1 is a plan view showing a state of carriages which travel in a traveling path region that is extended from an outward linear path section through a horizontal curved path section to a return linear path section.

An embodiment of the present invention will be described below with reference to FIGS. 1 to 5B, and in this embodiment, the present invention is implemented as conveying equipment including workpiece-conveying carriages which travel on a circulation traveling path formed with two parallel reciprocating linear path sections and leftward-curved horizontal curved path sections that connect together the two reciprocating linear path sections at both ends thereof. FIG. 1 shows a state of respective carriages 3 which travel in a traveling path region extended from an outward linear path section 1A through the horizontal curved path section 2 that makes a U-turn of 180 degrees to a return linear path section 1B.

The structure of the carriage 3 will first be described. The carriage 3 is formed with a frame portion 4 and a floor board portion 5 which is laid on the frame portion. The frame portion 4 is formed with a rod-shaped center member 6 which is formed with a rectangular steel pipe parallel to a carriage travel direction, an outer frame portion 7 which is provided so as to be continuous with a side (right side) opposite to the side of the rod-shaped center member 6 in a carriage turning direction, and an inner frame portion 8 which is provided so as to be continuous with the side (left side) of the rod-shaped center member 6 in the carriage turning direction. The outer frame portion 7 is formed in the shape of a rectangle whose length is substantially equal to the total length of the rod-shaped center member 6 and which is long in a forward/backward direction in plan view, and a friction driving plate-shaped member 9a is formed which is made of an angle member 9 forming a linear outer side and which suspends downward. The inner frame portion 8 is formed, in plan view, in the shape of a rectangle whose length and left/right lateral width are less than those of the outer frame portion 7, and on the side of the front end of the rod-shaped center member 6, the inner frame portion 8 is located in parallel to the outer frame portion 7 in a lateral direction.

Figure 5A:
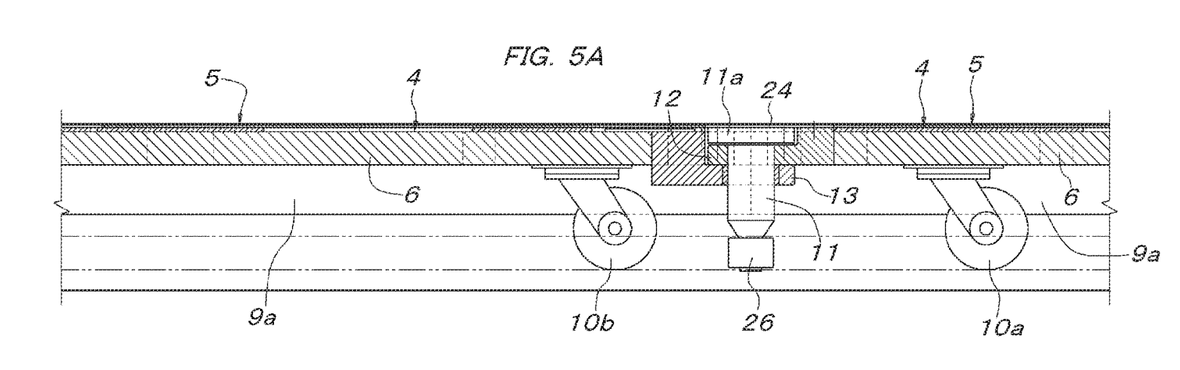
FIG. 5A is a vertically cross-sectional enlarged side view showing a coupling portion between the carriages and FIG.
Figure 5B:
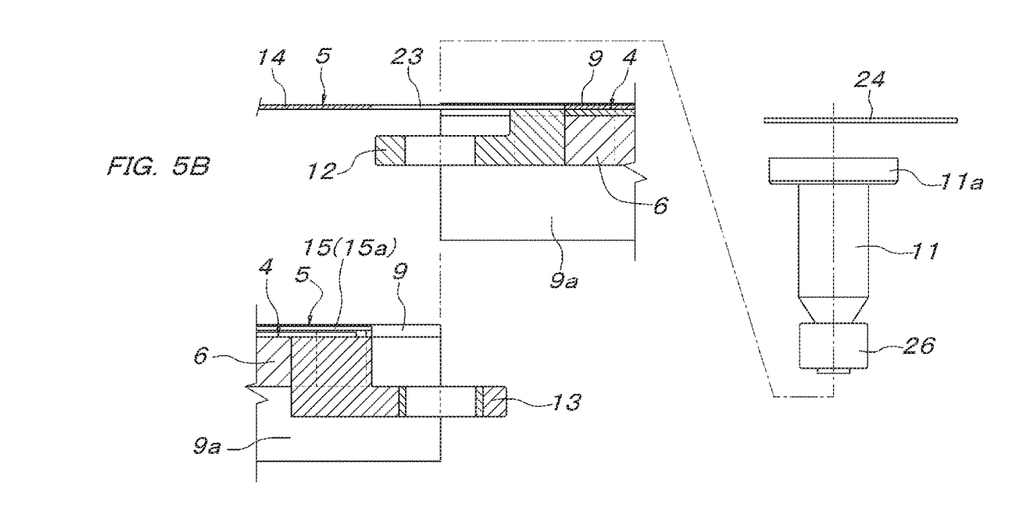

Caster wheels 10a to 10d are attached to the lower side of the frame portion 4 in positions near both front and rear ends of the outer frame portion 7 which are close to the outer side of the outer frame portion 7 and in positions of both front and rear ends of the inner side of the inner frame portion 8, and in both front and rear ends of the rod-shaped center member 6, bearings 12 and 13 are additionally provided through which vertical support shafts 11 inserted so as to be freely inserted/removed in an up/down direction. In an inner-side side end portion of the front end side of the inner frame portion 8, an auxiliary support portion 8a is provided so as to be extended and protruded forward. As shown in FIGS. 5A and 5B, the bearing 13 on the side of the rear end (hereinafter referred to as the lower bearing 13) concentrically enters directly below the bearing 12 (hereinafter referred to as the upper bearing 12) on the side of the front end of the carriage 3 which is located backward such that they are vertically overlaid. In a state where the vertical support shaft 11 is inserted from the upper bearing 12 to the lower bearing 13 which are vertically overlaid, the vertical support shaft 11 is detachably attached to the upper bearing 12 with a plurality of bolts in the circumferential direction thereof via an upper end flange portion 11a of the vertical support shaft 11. When the vertical support shaft 11 is attached as described above, the upper surface of the upper end flange portion 11a of the vertical support shaft 11 is substantially flush with the upper surface of the frame portion 4.

Figure 3A:
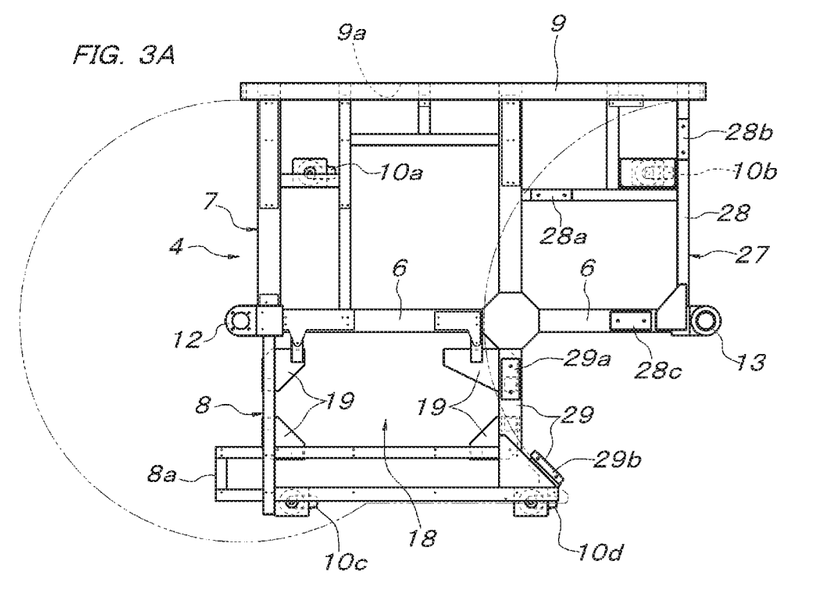
FIG. 3A is a plan view showing the frame portion of the carriage and FIG. 3B is a plan view showing the floor board portion of the carriage.
Figure 3B:
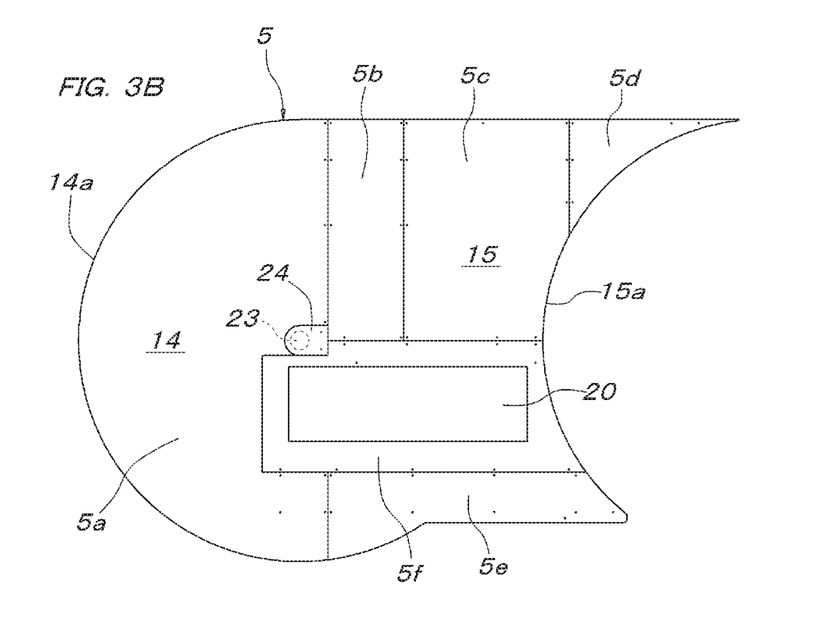

As shown in FIG. 3B, the floor board portion 5 is divided into a plurality of board members so as to adapt to the structure of the frame portion 5, and these plurality of board members 5a to 5f are individually screwed onto the frame portion 5 so as to form the floor board portion 5. The floor board portion 5 includes a floor board main portion 14 which includes a protruding arc-shaped end edge 14a that is concentric with the vertical support shaft 11 inserted into the bearing 12 at the front end of the rod-shaped center member 6 and a floor board sub-portion 15 which includes a recessed arc-shaped end edge 15a that is concentric with the vertical support shaft 11 inserted into the bearing 13 at the rear end of the rod-shaped center member 6. The radius of the recessed arc-shaped end edge 15a of the floor board sub-portion 15 is slightly larger than the radius of the protruding arc-shaped end edge 14a of the floor board main portion 14. Further, the outer end of the protruding arc-shaped end edge 14a of the floor board main portion 14 is connected to the linear outer side of the floor board sub-portion 15 in a tangential direction, the protruding arc-shaped end edge 14a has a circumferential length which exceeds, from the outer end, 180 degrees by about 30 degrees, and the linear inner side of the floor board sub-portion 15 is extended backward from the inner end of the protruding arc-shaped end edge 14a. Therefore, the left/right lateral width of the floor board sub-portion 15 of the floor board portion 5 is narrower than the maximum left/right lateral width (the diameter of the protruding arc-shaped end edge 14a) of the floor board main portion 14, the outer end of the recessed arc-shaped end edge 15a of the floor board sub-portion 15 is connected to the linear outer side of the floor board sub-portion 15 in the tangential direction, and the recessed arc-shaped end edge 15a has a circumferential length which is extended from the outer end so as to be about 30 degrees shorter than 180 degrees. Both the inner and outer sides of the floor board sub-portion 15 are linear and parallel to each other, and the length of the linear outer side is substantially equal to the length of the outer frame portion 7 in the frame portion 4.

The floor board portion 5 configured as described above is laid on the frame portion 4, and the position where it is laid is a position at which the linear outer side of the floor board sub-portion 15 makes contact with the inner side of the angle member 9 serving as the outer side of the outer frame portion 7 and at which the linear inner side of the floor board sub-portion 15 is located along the inner side of the inner frame portion 8. Although the specific structure of the actual frame portion 4 is changed depending on a device, etc., installed on this carriage 3, in this embodiment, a workpiece supporting raising/lowering table 16 is installed on the inner frame portion 8, therefore, in the inner frame portion 8, a rectangular opening portion 18 into which the raising/lowering drive device 17 of the raising/lowering table 16 is fitted and which is long in the forward/backward direction and a support plate portion 19 for supporting the raising/lowering drive device 17 at a certain height below the rectangular opening portion 18 are provided, and in the floor board portion 5, a rectangular opening portion 20 is provided in a position overlaid on the rectangular opening portion 18. The raising/lowering table 16 configured such that the raising/lowering table 16 is supported by a pantograph mechanism 21 so as to be freely raised/lowered in parallel, and a drive chain 22 for pushing up the raising/lowering table 16 vertically upward so as to raise the raising/lowering table 16 is pushed up and pulled back by the raising/lowering drive device 17.

Figure 4:
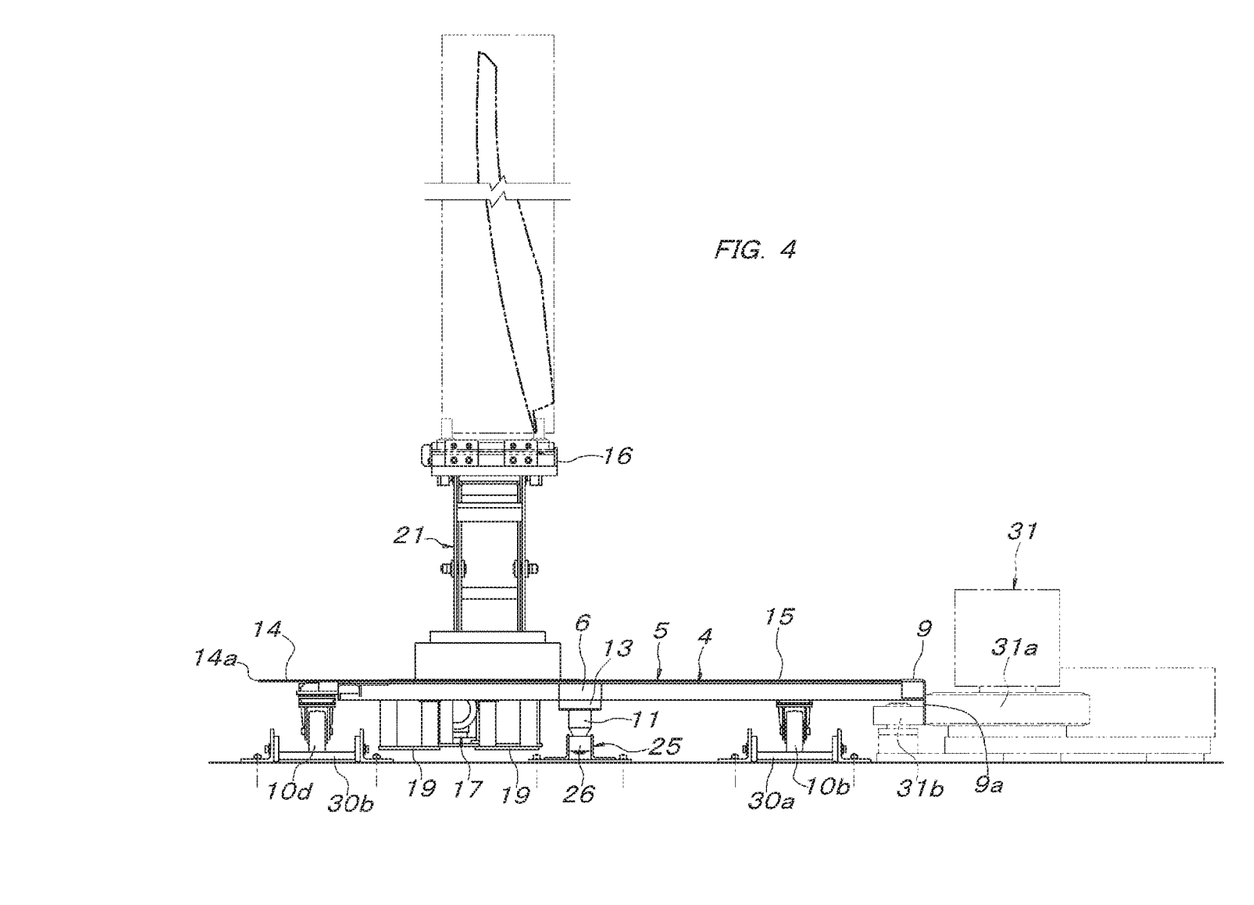
FIG. 4 is a rear view showing the carriage on a traveling path.

Further, as shown in FIG. 5B, in the floor board portion 5, an opening portion 23 is provided in a position overlaid on the upper bearing 12 on the side of the front end of the frame portion 4, and through the portion 23, the vertical support shaft 11 is attachable/detachable in the up/down direction together with the upper end flange portion 11a. A cover floor board 24 for blocking the opening portion 23 provided in the floor board portion 5 is detachably attached onto the frame portion 4 so as to be flush with the surface of the floor board portion 5. It is noted that, in order to make the respective carriages 3 travel along the traveling path, as shown in FIG. 4, a carriage guiding groove-shaped guide rail 25 is laid along the traveling path, and at the lower end of the vertical support shaft 11, a roller 26 which is loosely fitted into the carriage guiding groove-shaped guide rail 25 is pivotally supported. The roller 26 is self-rotatable around a vertical axis, and the diameter thereof is equal to or less than the diameter of the vertical support shaft 11.

In the carriage 3 configured as described above, as shown in FIG. 2B, the protruding arc-shaped end edge 14a is located at the front end of the floor board portion 5, and the recessed arc-shaped end edge 15a is located at the rear end of the floor board portion 5, and the rear end portion of the frame portion 4 overhangs backward from the recessed arc-shaped end edge 15a so as to form an overhanging portion 27 for supporting the floor board main portion 14 which overhangs forward from the frame portion 4 of the carriage 3 on the rear side. The overhanging portion 27 is formed with an overhanging main portion 28 which is formed with the rear end portion of the outer frame portion 7 that overhangs backward so as to cover a range of about 90 degrees in the inner side of the recessed arc-shaped end edge 15a, and an overhanging sub-portion 29 which is formed with the rear end portion of the inner frame portion 8 that slightly overhangs backward from the recessed arc-shaped end edge 15a.

Figure 2A:
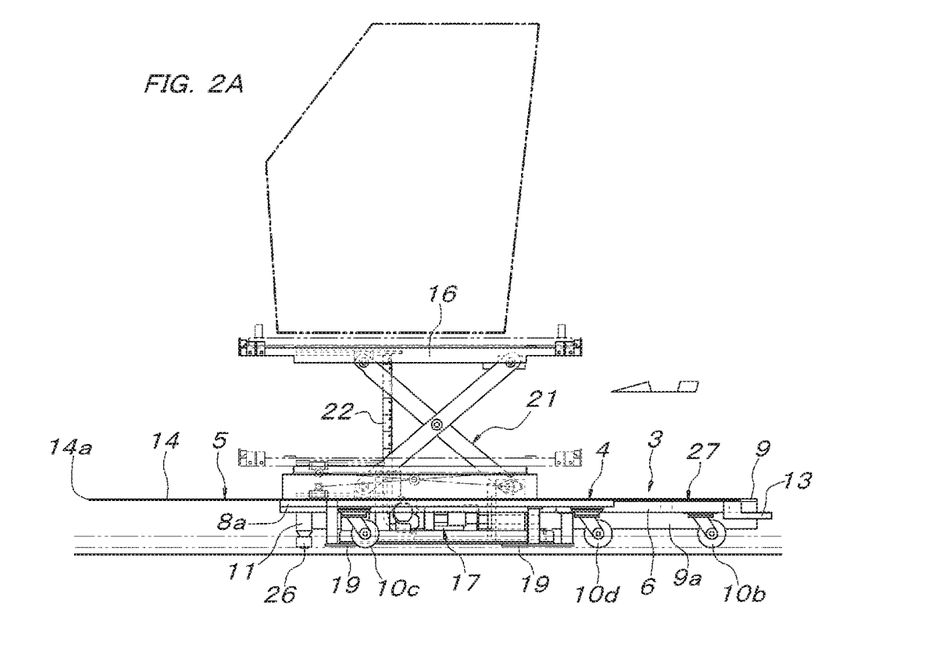
FIG. 2A is a side view of the carriage and FIG. 2B is a plan view thereof.
Figure 2B:
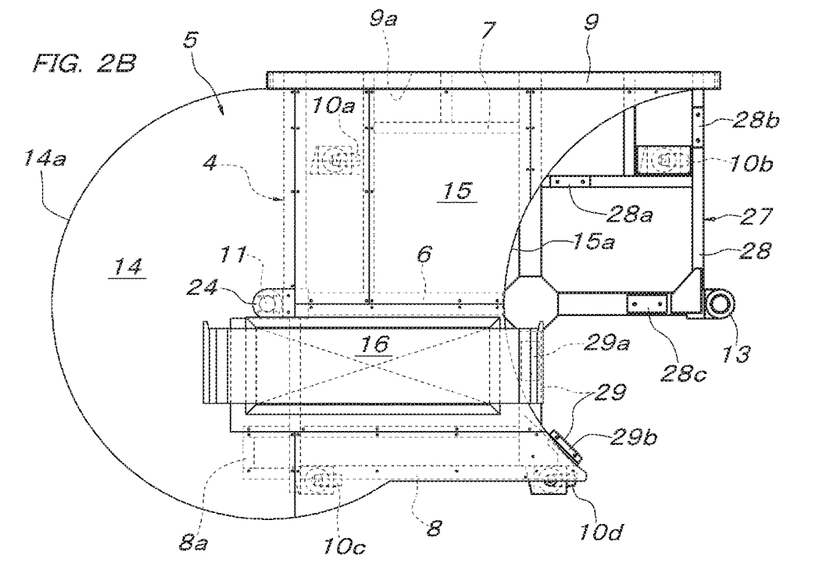

The overhanging main portion 28 supports a range of about 90 degrees in the outer side of the floor board main portion 14 which overhangs forward from the frame portion 4 of the carriage 3 on the rear side, and the overhanging sub-portion 29 supports an inner region in the vicinity of the protruding arc-shaped end edge 14a which is not supported by the overhanging portion 27 of the floor board main portion 14. On the overhanging main portion 28 and the overhanging sub-portion 29, sliding plates 28a to 28c, 29a and 29b are laid which are formed of a material that can reduce frictional resistance with the floor board main portion 14 of the carriage 3 on the rear side that is supported.

As shown in FIG. 1, the carriages 3 configured as described above are set on the traveling path so as to be able to travel in a state where they are coupled to each other in the travel direction so as to be continuous in the shape of a band, and as shown in FIG. 4, on the traveling path, not only the carriage guiding groove-shaped guide rail 25 into which the rollers 26 pivotally supported to the lower ends of the vertical support shafts 11 of the respective carriages 3 are loosely fitted so as to be self-rotatable but also a band-shaped guide rail 30a which supports pairs of front and rear caster wheels 10a and 10b on the outer side of the respective carriages 3 such that they freely roll and a band-shaped guide rail 30b which supports pairs of front and rear caster wheels 10c and 10d on the inner side of the respective carriages 3 such that they freely roll are laid. Therefore, an operation of setting the respective carriages 3 on the traveling path can be performed by the following procedure. A plurality of carriages 3 to which the vertical support shafts 11 are not attached are first placed, with the floor board main portions 14 of the floor board portions 5 directed to the side of the travel direction, such that the caster wheels 10a to 10d are placed on the pair of left and right band-shaped guide rails 30a and 30b.

Next, the two adjacent carriages 3 are moved so as to approach each other on the traveling path, the lower bearing 13 on the side of the rear end of the carriage 3 on the front side is made to enter below the upper bearing 12 on the side of the front end of the carriage 3 on the rear side, and in a state where the shaft holes of both the upper and lower bearings 12 and 13 are concentrically located, the vertical support shaft 11 in which the roller 26 is pivotally supported to the lower end is inserted, from the opening portion 23 in the floor board portion 5 with the cover floor board 24 removed, downward into the shaft holes of both the upper and lower bearings 12 and 13. Here, the positions of the carriages 3 are adjusted such that the roller 26 at the lower end of the vertical support shaft 11 is loosely fitted into the carriage guiding groove-shaped guide rail 25, and thus the roller 26 is loosely fitted into the carriage guiding groove-shaped guide rail 25. Thereafter, the upper end flange portion 11a of the vertical support shaft 11 is screwed so as to be fixed to the upper surface of the upper bearing 12, and the cover floor board 24 is attached so as to block the opening portion 23. In this way, the two front and rear carriages 3 which are coupled together are set on the traveling path, and consequently, the floor board main portion 14 of the floor board portion 5 which overhangs forward from the frame portion 4 of the carriage 3 on the rear side is overlaid on the overhanging portion 27 of the frame portion 4 of the carriage 3 on the front side so as to be supported. Specifically, on the respective sliding plates 28a to 28c on the overhanging main portion 28 of the frame portion 4 of the carriage 3 on the front side and on the respective sliding plates 29a and 29b on the overhanging sub-portion 29, the floor board main portion 14 of the floor board portion 5 which overhangs forward from the frame portion 4 of the carriage 3 on the rear side is supported, and the protruding arc-shaped end edge 14a of the floor board main portion 14 of the carriage 3 on the rear side is concentrically adjacent to the recessed arc-shaped end edge 15a of the floor board sub-portion 15 of the carriage 3 on the front side.

Likewise, the carriages 3 are placed on the entire region of the traveling path, the carriages 3 which are adjacent in the forward/backward direction are coupled to each other with the vertical support shafts 11, it is therefore possible to form a carriage line which is continuous in the shape of an endless band. In this carriage line, on the two reciprocating linear paths 1A and 1B, the angle members 9 forming the outer sides of the frame portions 4 of the respective carriages 3 abut against each other in the forward/backward direction, and thus the respective friction driving plate-shaped members 9a are continuous in the travel direction, with the result that, for example, in a place suitable for efficiently propelling all the carriages 3 such as a place in the vicinity of the starting point of the two reciprocating linear paths 1A and 1B, etc., as indicated by imaginary lines in FIGS. 1 and 4, a friction drive device 31 can be arranged. As the friction drive device 31, a conventional known friction drive device can be utilized that is formed with a motor-driven friction drive wheel 31a which is pressed against the outer surface of the friction driving plate-shaped member 9a and a backup roller 31b which makes contact with the inner surface of the plate-shaped member 9a.

The carriage 3 which receives thrust in a forward direction from the friction drive device 31 described above travels forward while pushing the carriages 3 on the front side, thus all the carriages 3 on the traveling path in the shape of a circulating path travel at a certain speed so as to be circulated and the postures of the respective carriages 3 are held in parallel to the traveling path with the rollers 26 at the lower ends of the vertical support shafts 11 located at both front and rear ends of the frame portion 4 and the carriage guiding groove-shaped guide rail 25 into which the rollers 26 are loosely fitted. When each carriage 3 which is pushed by the carriage 3 on the rear side or is pulled by the carriage 3 on the front side enters the horizontal curved path section 2 so as to travel within this horizontal curved path section 2 while being guided by the carriage guiding groove-shaped guide rail 25, although the both carriages 3 adjacent in the forward/backward direction swing relatively horizontally around the vertical support shaft 11 coupling the both carriages 3 together, the horizontal relative swinging of the carriages 3 around the vertical support shaft 11 is allowed by the relative turning of the protruding arc-shaped end edge 14a and the recessed arc-shaped end edge 15a concentrically adjacent to each other between both the front and rear carriages 3 around the vertical support shafts 11 located at the arc centers of each of the edges. Here, the floor board main portion 14 of the floor board portion 5 in the carriage 3 on the rear side slides on the sliding plates 28a to 29b on the overhanging portion 27 (the overhanging main portion 28 and the overhanging sub-portion 29) of the frame portion 4 in the carriage 3 on the front side.

As indicated in FIG. 1, the horizontal relative swinging of the carriages 3 adjacent in the forward/backward direction when the carriages 3 travel in the horizontal curved path section 2 is allowed until the inner end of the recessed arc-shaped end edge 15a of the floor board sub-portion 15 in the floor board portion 5 of the carriage 3 on the front side reaches the inner end (recessed corner portion with the linear inner side of the floor board sub-portion 15) of the protruding arc-shaped end edge 14a of the floor board main portion 14 in the floor board portion 5 of the carriage 3 on the rear side. Therefore, it suffices to set the angle (in an example shown in the figure, about 180 degrees+30 degrees) with respect to the arc center from the outer end to the inner end of the protruding arc-shaped end edge 14a of the floor board main portion 14 in the floor board portion 5 of the carriage 3, according to the rotation radius of the horizontal curved path section 2.

When each carriage 3 travels in the horizontal curved path section 2, the front end portion of the inner frame portion 8 in the frame portion 4 of the carriage 3 on the rear side enters a recessed space between the outer frame portion 7 and the inner frame portion 8 in the frame portion 4 of the carriage 3 on the front side. The depth of the entry is increased as the horizontal relative swinging angle between the carriages 3 adjacent in the forward/backward direction when the carriages 3 travel in the horizontal curved path section 2 is increased, therefore, by setting the position of the front end of the inner frame portion 8 in the frame portion 4 in a range in which the rear end of the inner frame portion 8 in the frame portion 4 of the carriage 3 on the front side do not collide with the front end portion of the inner frame portion 8 in the frame portion 4 of the carriage 3 on the rear side, it is possible to enhance an effect of supporting the floor board main portion 14 of the floor board portion 5 with the frame portion 4. The auxiliary support portion 8a indicated in the embodiment helps enhance the effect of supporting the floor board main portion 14 of the floor board portion 5.

As described above, in the conveying equipment of the above embodiment, the floor board portions 5 of the carriages 3 which travel on the endless, circulating traveling path formed with the two reciprocating linear path sections 1A and 1B and the horizontal curved path sections 2 at both ends are continuous in the shape of a band not only in the two reciprocating linear path sections 1A and 1B but also in the horizontal curved path sections 2 at both ends. Therefore, an operator can walk safely on the floor board portions 5 of the respective carriages 3 which are continuous in the shape of a band and it is also possible to safely perform, for example, an operation of mounting a part to the workpiece placed on the raising/lowering table 16 of each carriage 3.

It is noted that, it is possible to replace the travel drive device which propels the respective carriages 3 with a device whose system differs from that of the friction drive device 31, or, it is also possible to configure such that the layout of the entire traveling path can be set freely by arranging the friction driving plate-shaped member 9a to be driven by the friction drive device 31 in a position close to the center on the lower side of the frame portion 4 of each carriage 3, changing the shape of the frame portion 4 of each carriage 3 such that the current inner frame portions 8 are arranged symmetrically, and also changing the shape of the floor board sub-portion 15 of the floor board portion 5 laid on the frame portion 4 such that the current floor board sub-portions 15 are arranged symmetrically, so as to form the entire floor board portion 5 symmetrically, in which a leftward-curved horizontal curved path section and a rightward-curved horizontal curved path section are provided in the traveling path of the carriage 3. Although in the description of the above embodiment, the carriage 3 travels in such a direction that the floor board main portion 14 of the floor board portion 5 having the protruding arc-shaped end edge 14a is located at the front end in the travel direction, the carriage 3 can also be made to travel in the direction opposite thereto.

Carriage-utilizing conveying equipment according to the present invention can be utilized as carriage-utilizing conveying equipment in which, in either of a linear path section or a horizontal curved path section, respective carriages are made to travel in a state where floor surface portions are continuous in the shape of a band such that, on the floor board portions of the carriages, an operator can walk safely and operations on a loaded workpiece can be safely performed.

What is claimed is:

1. Carriage-utilizing conveying equipment comprising:
workpiece-conveying carriages that travel on a traveling path including a horizontal curved path section in a state where the carriages are coupled to each other so as to freely swing relatively horizontally around a vertical support shaft; each carriage including a frame portion whose front and rear ends are coupled to an adjacent carriage with front and rear vertical support shafts and including a floor board portion which is supported by the frame portion;
the floor board portion including a floor board main portion having a protruding arc-shaped end edge concentric with one of the front and rear vertical support shafts and including a floor board sub-portion having a recessed arc-shaped end edge concentric with another one of the front and rear vertical support shafts;
the protruding arc-shaped end edge of the floor board main portion in a first carriage and the recessed arc-shaped end edge of the floor board sub-portion in a second carriage adjacent in a forward/backward direction to the first carriage are adjacent such that the protruding arc-shaped end edge of the first carriage and the recessed arc-shaped end edge of the second carriage are relatively rotatable at a same height around the common vertical support shaft located at arc centers of each of the protruding and recessed arc-shaped end edges and the floor board main portion which overhangs, in one direction, from one end portion of the frame portion in the first and second carriages is supported on an overhanging portion which overhangs from the floor board sub-portion of the frame portion in the adjacent carriage so as to be freely relatively rotated;

an upper bearing to which the vertical support shaft is removably attached in an up/down direction is provided in an end portion of the frame portion of the carriage on a side of the floor board main portion;

a lower bearing which is overlaid on a lower side of the upper bearing and through which the vertical support shaft protruded from the upper bearing is inserted so as to be freely relatively rotated is provided in an end portion of the frame portion on a side of the floor board sub-portion; and     an opening portion through which the vertical support shaft is inserted/removed with respect to the upper bearing is provided in the floor board portion, and a cover floor board in the floor board portion which blocks the opening portion and which is freely attached/detached are provided.

2. The carriage-utilizing conveying equipment according to claim 1, wherein a carriage guiding groove-shaped guide rail is laid along the traveling path; a roller which is loosely fitted into the guide rail and which is self-rotatable around a vertical axis is pivotally supported to a lower end of the vertical support shaft; and a diameter of the roller is equal to or less than a diameter of the vertical support shaft.

* * * * *